(No Model.)
R. A. LINDNER.
ADJUSTABLE DISPLAY RACK.
No. 507,740. Patented Oct. 31, 1893.
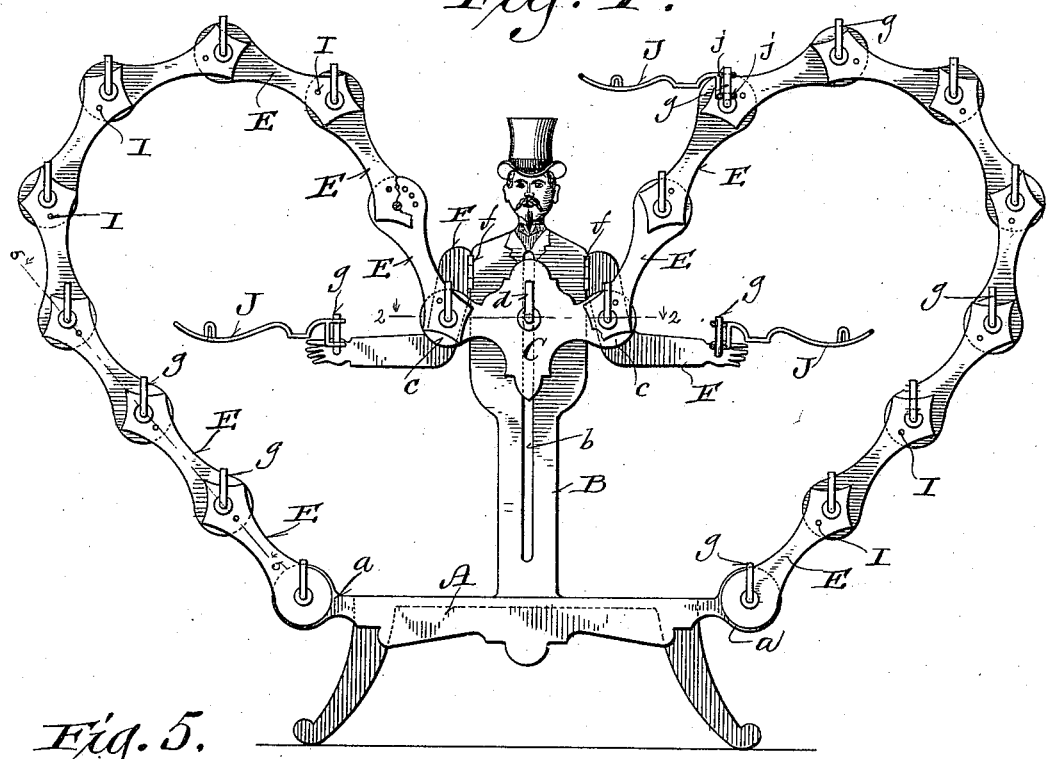
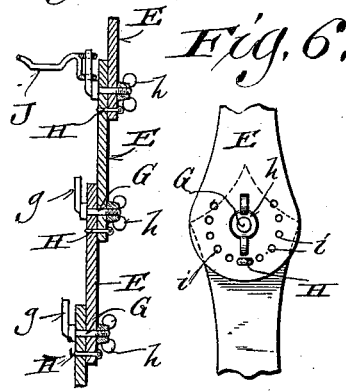
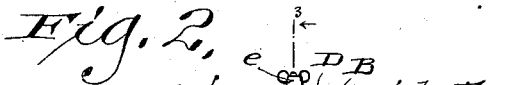
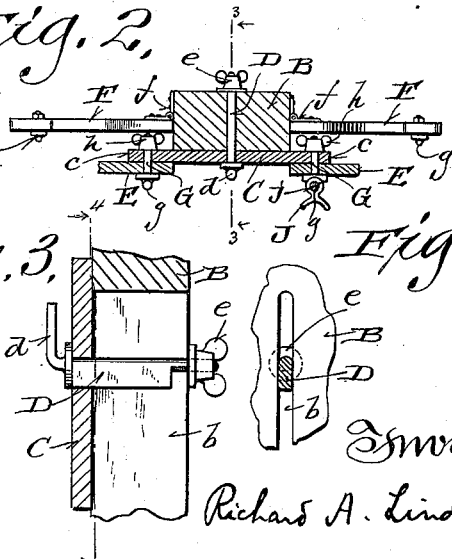
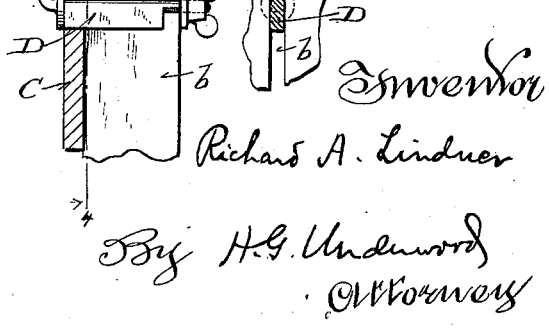
Witnesses,
Geo. W. Irving
J. U. Sevenberger
Inventor
Richard A. Lindner
By H. G. Underwood
Attorneys

UNITED STATES PATENT OFFICE.

RICHARD A. LINDNER, OF SHEBOYGAN FALLS, WISCONSIN.

ADJUSTABLE DISPLAY-RACK.

SPECIFICATION forming part of Letters Patent No. 507,740, dated October 31, 1893.

Application filed June 27, 1893. Serial No. 478,951. (No model.)

*To all whom it may concern:*

Be it known that I, RICHARD A. LINDNER, a citizen of the United States, and a resident of Sheboygan Falls, in the county of Sheboygan, and in the State of Wisconsin, have invented certain new and useful Improvements in Adjustable Display-Racks; and I do hereby declare that the following is a full, clear, and exact description thereof.

My invention relates to adjustable display racks, and consists in certain peculiarities of construction and combination of parts as will be fully set forth hereinafter and subsequently claimed.

In the drawings: Figure 1 is a front elevation of my improved device. Fig. 2 is a horizontal section on the line 2—2 of Fig. 1. Fig. 3 is a detail section on the line 3—3 of Fig. 2. Fig. 4 is a detail section on the line 4—4 of Fig. 3. Fig. 5 is a detail section on the line 5—5 of Fig. 1. Fig. 6 is a detail view on an enlarged scale, showing the link attaching devices, from the rear.

A represents the base or platform of my device, preferably supported on legs as shown, and provided with projections, or lugs *a a*. From said platform there rises a post B the one shown being ornamented, at its upper end, by being shaped into the semblance of the head and shoulders of a man, wearing a tall hat, but that being immaterial. This post is provided with a central vertical slot *b*.

C is a vertically movable plate, provided with projections or lugs *c c* and D is a flat bolt, passing through said plate C and the slot *b*, and terminating in a screw-threaded shank to receive a thumb-nut *e*, the head of this bolt being provided with an upwardly projecting hook or pin *d*, and the plate C being clamped to the front of the post B, at any elevation to which it may have been adjusted, between the head of the bolt D and the thumb-nut *e*. To make the resemblance to a man's figure greater, I have provided the post B with two arms F F, hinged thereto as shown at *f f*.

E E E represent a series of links extending from the lug *a* on the base A to the lug *c* on the plate C on each side of the post B. These links are provided with round perforations at each end, so that, when put together as best shown in Fig. 5, these perforations may receive round bolts G G whose heads have upturned hooks or pins *g g* and whose shanks are screw-threaded to receive clamping nuts *h*, similar to the described bolts D and attachments, except that the bolts G have wholly round bodies or shanks. By tightening the nuts *h*, the links E E are clamped together, but in the event of considerable weight being placed upon the hooks or pins *g g* this frictional contact may be insufficient, and to guard against this danger, one end of each link E is preferably provided with a series of holes *i i i* arranged radially around the bolt perforation, and the adjacent end of the other attached link is provided with a perforation I disposed so as to register with any one of the said perforations *i i*, when the links are turned on the bolt G, and then when the links are in the desired relative positions a pin H is slipped through the holes I *i*, thus securely guarding against any slipping of the attached links E E in case the nut *h* does not hold, or becomes loosened.

J J represent brackets or racks, of any preferred form, provided at their inner ends with eyes or sockets *j j* to slip over the described hooks or pins *g g d*. The arms F of the post B are provided with similar posts *g* to receive corresponding brackets. The brackets shown are designed to hold shoes, slippers, &c., and are correspondingly shaped, but obviously may be of any form preferred according to the nature of the articles to be supported and displayed thereby.

In the drawings, I have shown my links disposed in a general heart-shaped form, but it will be understood that the arrangement may be varied in an infinite variety of ways so as to present a great number of either regular or irregular figures, and thereby greatly enhance the value of my device as a display rack, by changing its shape from day to day, as the links themselves can not only be turned to various angles or projections, but, by reason of the sliding plate C, the inner ends of the chains of links can be varied indefinitely in elevation.

Having thus described my invention, what I claim as new, and desire to secure by Letters Patent, is—

1. In an adjustable display rack, the combination with a suitable platform or base of a post rising therefrom, a plate movable on said post and a chain of links extending from said plate to said base and provided with bracket holding devices, substantially as set forth.

2. In an adjustable display rack, the combination with a suitable platform or base, of a slotted post, a plate movable on said post, a bolt passing through said plate and slot and provided with a clamping device, and a series of adjustable links forming a chain extending between said plate and base, and united by bolts terminating in bracket holding devices, substantially as set forth.

3. In an adjustable display rack, the combination with a suitable platform or base, of a slotted post rising therefrom, a plate movable on said post, a bolt passing through said plate and slot and provided with a clamping nut, a series of adjustable links forming a chain extending between said plate and base, each link being provided with a bolt hole at each end, and with a radially arranged series of perforations at one end, and an extra perforation at the other end, bolts adapted to pass through said bolt holes in the links, and having bracket holding devices at one end and clamping nuts at the other end, and locking pins adapted to pass through the said other holes in the links, substantially as set forth.

4. In an adjustable display rack, the combination with a suitable platform or base, of a slotted post rising therefrom, a plate movable on said post, a bolt passing through said plate and provided with a clamping device, series of adjustable links, forming chains, extending between said plate and base, one chain on each side of said post, said links being united by bolts terminating in upright pins or hooks at one end and clamping nuts at the other end, and movable brackets journaled in said upright pins or hooks, substantially as set forth.

In testimony that I claim the foregoing I have hereunto set my hand, at Sheboygan Falls, in the county of Sheboygan and State of Wisconsin, in the presence of two witnesses.

RICHARD A. LINDNER.

Witnesses:
ERNST HELLIGE, Jr.,
J. H. JAMES.